June 5, 1962  A. B. SKROMME ET AL  3,037,780
MATERIAL UNLOADER WITH CROSS CONVEYOR AND ROTOR
Filed Oct. 10, 1958

INVENTORS
A. B. SKROMME &
R. S. WILKES
BY
ATTORNEYS

United States Patent Office 3,037,780
Patented June 5, 1962

3,037,780
MATERIAL UNLOADER WITH CROSS
CONVEYOR AND ROTOR
Arnold B. Skromme and Raymond S. Wilkes, Moline, Ill., assignors to Deere & Company, Moline, Ill., a corporation of Delaware
Filed Oct. 10, 1958, Ser. No. 766,468
7 Claims. (Cl. 275—6)

This invention relates to a material unloading implement with a cross conveyor and a rotor or beater. More particularly this invention relates to an improvement for a material unloading wagon of the type having a fore-and-aft extending material container with power driven means for moving material toward an open end of the container, and an integral cross conveyor structure at the open end which feeds material transverse and outwardly from the container.

In one of the conventional types of material unloader generally used for transporting and discharging forage material, hay, and other feeding material, there is provided an elongated fore-and-aft extending box or material container carried on a mobile frame and having a floor conveyor moving the material to one end of the box. At the end of the conveyor there is provided a series of beaters and a cross conveyor which receives the material from the floor conveyor and moves the material outwardly of the box. The purpose of the cross conveyor is to discharge the material, for example, in a feed trough which is available to livestock.

It is the object of the present invention to further utilize the method of discharge presently used in the above type of material unloader and to convert the unloader into a manure spreader type of implement. The specific object is to provide an attachment including a rotor or beater means at the outer end of the cross conveyor which will operate to throw or scatter material issuing from the discharge end of the conveyor upwardly and outwardly from the conveyor to be evenly distributed upon the ground on which it lands. The rotor is constructed so as to generally pulverize the material prior to its discharge over the ground.

It is an object of this invention to provide the above attachment so that the drive required for the attachment is taken directly from the power source which drives the other elements of the material unloader.

Other objects and advantages of the invention will become apparent to those skilled in the art as the nature of the invention is better understood from the following description and as shown in the accompanying drawings.

Figure 1:
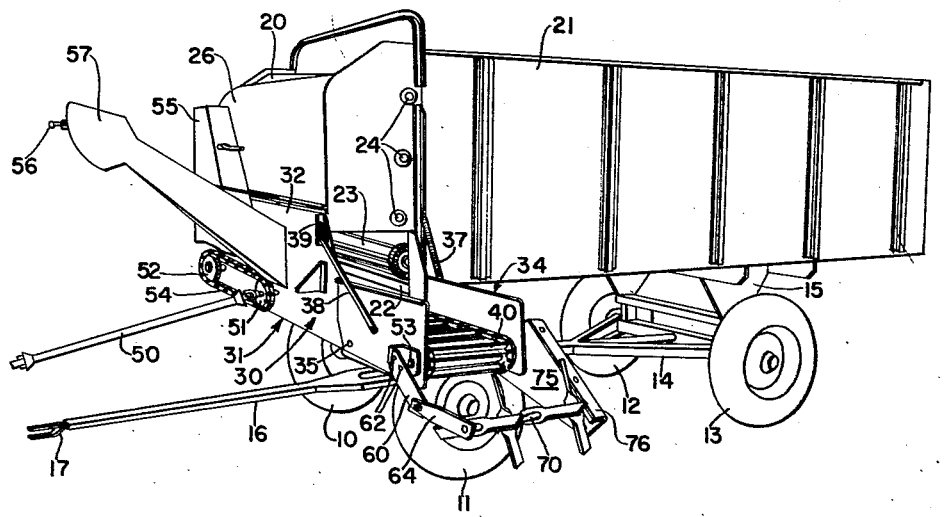
FIG. 1 is a front and side perspective of the material unloader and the attachment.
Figure 2:
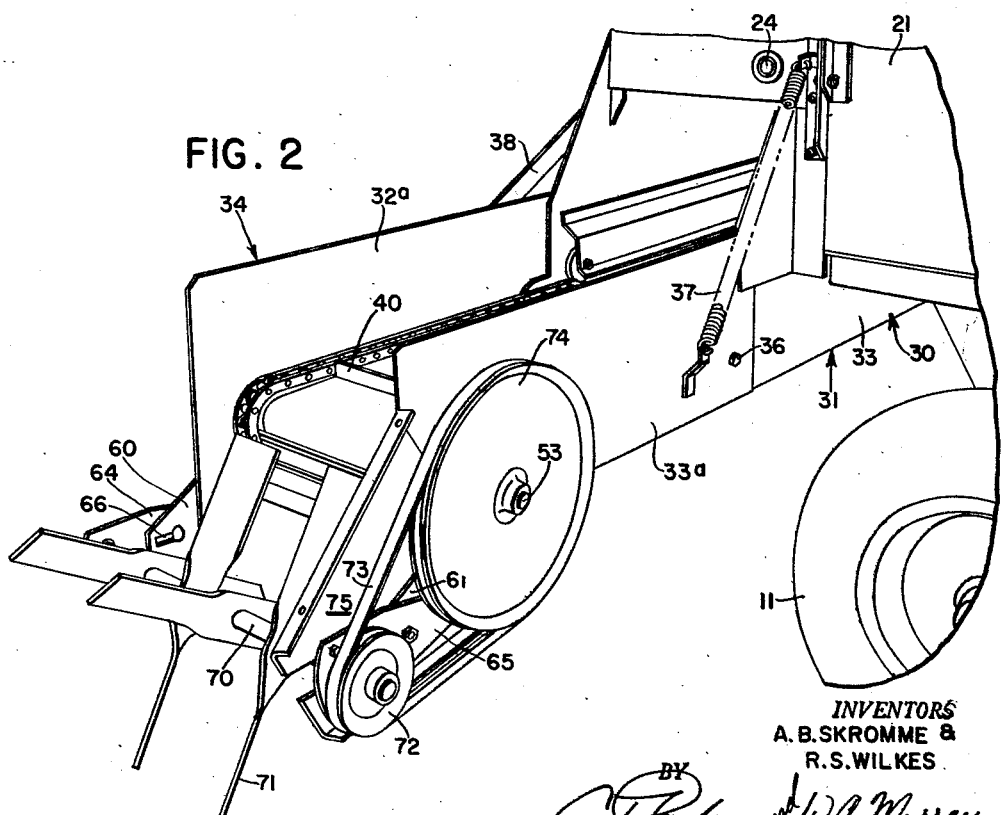
FIG. 2 is a rear and side perspective of a forward portion of the material unloader and showing the mounting of the attachment on the cross conveyor.

The material unloader is supported on a mobile gear or frame composed of front wheels 10, 11 and rear wheels 12, 13, a laterally disposed frame structure 14 including upwardly projecting structure 15 extending above the rear wheels 12, 13 and the front wheels 10, 11. A tongue member 16 extends forwardly from the front end of the frame structure 14 and has a clevis type connection 17 at its forward end for connection to the drawbar of a tractor, not shown, or other type of draft vehicle.

The material unloader or mixer-feeder type of wagon includes therein an elongated fore-and-aft extending box structure having transversely spaced upright sides 20, 21 interconnected at their lower edges by a floor 22. The rear end of the box is closed and the forward end of the box is left open other than by structure herein to be described. Mounted on the floor 22 is a floor conveyor, shown only partially in FIG. 1 and indicated in its entirety by the reference numeral 23. The floor conveyor 23 operates as power driven means for moving material toward the forward or open end of the box. Also at the forward end of the box are a series of vertically spaced apart beaters, indicated in their location by the beater shafts 24, which tend to beat or break up the material moving forwardly by the floor conveyor 23 and to direct the material generally forwardly and downwardly. Forwardly of the beaters is a front upright panel 26 which partially closes the container or box forward of the beaters. As may be seen, the front panel 26 extends between forward extensions of the side walls 20, 21.

Positioned at the forward end of the box is a cross conveyor structure indicated in its entirety by the reference numeral 30. The cross conveyor 30 includes a trough structure 31 generally of U-shaped cross section which has a front upright panel 32 supported in depending relation from the lower edge of the front upright panel 26. A rear leg portion or panel 33 of the trough structure is supported in depending relation from the floor 22 of the unloader box. The cross conveyor also includes as a part thereof an outer elevator or end portion 34 pivotally mounted at its inner end by means of bolts 35, 36 which permit the outer section 34 to be elevated relative to the inner conveyor section. The elevator 34 includes front and rear upright wall structures 32a and 33a defining a general continuation of the walls 32, 33 of the conveyor. A spring 37 is provided between the wall 21 and the side panel 33a of the elevator 34 for aiding in raising or lowering of the elevator. A bar 38 extends from the front upright or side panel 32a through a bracket 39 extending forwardly from the front face of the panel 32, suitable means being provided in the bracket for locking the bar in any fixed position so as to hold the elevator 34 in the desired angular relation to the inner cross conveyor section. Supported on the floor of the cross conveyor 30 is a raddle type conveyor 40 having upper and lower flights. The upper flight receives the material from the floor conveyor 23 and moves the material transversely and outwardly to the outer discharge or terminal end of the elevator 34 in spaced relation to the box or container of the material unloader.

The power source for operating the floor conveyor as well as the raddle of the cross conveyor is conventionally taken from the power take-off shaft of the tractor and includes therein a drive shaft 50, serving as the main power source of the implement, which is adapted for connection at its forward end to a tractor power take-off shaft and is connected at its rear end to a sprocket shaft on which is supported a chain sprocket 51. Mounted on opposite ends of the cross conveyor 30 is a pair of shafts 52, 53 which support the drive elements for the raddle type conveyor 40. Other driving mechanisms for driving the floor conveyor 23 and the beater shafts 24 is contained under the drive housing 55. The entire driving mechanism is generally controlled by means of the control lever 56 with its connecting linkage, not shown to the driving mechanism contained within the forwardly projecting housing 57. A detailed study of the drive mechanism is not presented within this specification since it is deemed not necessary for a full appreciation of the present invention. However, it should be recognized that the drive is adjustable to cause the shaft 52 to rotate in a direction so that the upper flight of the raddle 40 moves outwardly. Generally the material unloader may be treated as being similar in such respects to that shown in U.S. Patent 2,772,796.

A pair of brackets 60, 61 are positioned at the outer terminal end of the elevator 34 and extend outwardly and downwardly from that end. The brackets 60, 61 are bolted, as at 62, to the conveyor structure or more specifically to the upright side panels 32a, 33a of the elevator.

On the lower end of the brackets 60, 61 is a pair of outwardly extending brackets 64, 65 bolted to the brackets 60, 61 through slots, one being shown at 66 which permits the brackets 64, 65 to be moved longitudinally relative to the conveyor 30. As will later become apparent, the purpose of the adjustment is for take up in a V-belt drive which operates the rotor in the mechanism. Journaled at opposite ends to the brackets 64, 65 is a fore-and-aft extending shaft 70. Fixed to the shaft 70 are blades or arms 71 which rotate in unison with the shaft 70. As is apparent, the shaft 70 and blades 71 operate as a rotor with the arms 71, upon rotation, moving adjacent to and upwardly relative to the end of the cross conveyor 30. The rear end of the shaft 70 is provided with a pulley 72 over which is provided a V-belt 73 driven by a pulley 74 fixed to the rear end of the shaft 53. Shielding, as at 75, 76, covers the V-belt drive.

Rotation of the shaft 70 is effected by the main power source which in conventional manner will be driven from the power take-off shaft on the tractor. The drive for the attachment shaft 70 includes the drive shafts 50, the chain and sprocket drive 51, 52, 54 and the chain members of the raddle conveyor 40 which operate to rotate the shaft 53 which in turn causes the shaft 70 to rotate through means of the V-belt drive 72, 73, 74. It should be noted, that a direct drive could be taken either from the power take-off shaft of the tractor or from the main drive shaft 50 if deemed desirable, but for purposes of economy, the present drive means is preferred. It should also be noted that the entire attachment which supports the shaft 70 and its associated arm 71 may be attached or detached from the cross conveyor merely by removing or connecting the brackets 60, 61 from the panels 32a, 33a.

The main purpose of the present attachment is to convert a conventional material unloader which is normally used to unload hay, forage material and other such feeding materials into a manure spreader. In operation, therefore, when the attachment is in use, manure will be fed forwardly from the box by means of the floor conveyor 23 to the forward cross conveyor 30. The cross conveyor 30 will then move material transversely and outwardly from the box structure to be discharged at the terminal or discharge end of the elevator 34. Since the shaft 70 and the rotor blades 71 are positioned downwardly and outwardly relative to the discharge or terminal end of the elevator 34, material will generally fall within the path of the arms and generally on the arms. The shaft 70 and arms will be rotated so that the side of the rotor adjacent to the end of the conveyor will be moving upwardly and will tend to throw the material discharging from the conveyor upwardly and outwardly. It will be noted, from viewing the drawings, that the blades or arms 71 are turned to provide a faced surface inclined relative to the direction of rotation so as to drive the material axially rearwardly. It will therefore be fully understood that in operation, and particularly upon the shaft moving at a relatively high rate of rotation that material will be spread from the end of the conveyor 34 upwardly and outwardly, and in a direction rearwardly and away from the operator's station on the tractor. Also, the arms 71 will operate as blades causing the material to come off the arms in a pulverized or reduced condition. Obviously, when it is desired to again unload feeding material, or material which should not be thrown from the wagon box, the entire rotor or attachment may easily be removed from the vehicle.

While only one form of the invention has been shown, it should be recognized that other forms and modifications will undoubtedly occur to those skilled in the art. Therefore, it should be understood that while the preferred form was shown and described in details for the purpose of clearly and concisely illustrating the principles of the invention, it is not the intention to so limit or narrow the invention beyond the broad general principles set forth in the appended claims.

What is claimed is:

1. A spreading attachment for use in conjunction with a material containing box having power means operating from a power source for moving material toward an open end of the box, and an integral cross conveyor structure at the open end of the box terminating spacedly outwardly of the box, the attachment comprising: bracket structure extending outwardly and downwardly from the terminal end of the cross conveyor structure; means for detachably connecting said bracket structure to the conveyor structure; a rotatable shaft supported on the bracket structure spacedly outwardly and downwardly of the terminal end of the cross conveyor; a rotor including radial pulverizing-and-throwing elements on the shaft; and drive means extending from the power source for rotating the shaft and rotor, the side of said rotor adjacent the discharge end of the conveyor structure moving upwardly for effecting movement of material discharging from the conveyor structure upwardly and outwardly relative to the conveyor structure.

2. The invention defined in claim 1 in which the radial elements are in the form of arms having faced surfaces inclined to the direction of rotation of the rotor for effecting axial movement of material as it is discharged from the arms.

3. A material unloader comprising: a material containing box having an open end for discharge; power driven means for moving material toward the open end of the box; an integral cross conveyor structure supported at the open end of the box and terminating outwardly of the box; an attachment comprising a bracket structure mounted on and extending outwardly and downwardly from the outer end of the conveyor structure; a pulverizing-and-throwing rotor rotatably supported on the bracket structure spacedly outwardly and downwardly of the discharge end of the cross conveyor; and drive means extending from the power driven means for rotating the rotor, the side of said rotor adjacent the discharge end of the conveyor structure moving upwardly for effecting movement of material discharging from the conveyor structure upwardly and outwardly relative to the conveyor structure.

4. A material spreader comprising: a material containing box having an open end for discharge; power driven means for moving material toward the open end of the box; a cross conveyor structure at the open end of the box, terminating outwardly of the wagon box, said conveyor structure including a driven rotating shaft proximate its outer terminal end; bracket structure extending outwardly from the terminal end of the conveyor structure; means for detachably connecting said bracket structure to the conveyor structure; a rotatable shaft supported on the bracket structure spacedly outwardly of the terminal end of the cross conveyor; material scattering means on the shaft extending proximate the terminal end of the conveyor structure; and drive means extending from the driven shaft for effecting rotation of the rotatable shaft to effect scattering movement of material discharging from the conveyor structure outwardly relative to the conveyor structure.

5. A material unloading vehicle comprising an elongated material container having opposite ends, a laterally disposed floor, and upright side walls extending upwardly from opposite edges of the floor and extending between the opposite ends; a floor conveyor for moving material over the floor to one end of the container; a transverse conveyor supported on the container at said one end of the container for receiving material from the floor conveyor and extending outwardly of at least one of said side walls for effecting side discharge of the material, the respective side walls having a discharge opening accommodating the transverse conveyor; support means on said transverse conveyor outwardly of said one side wall, a rotor structure on said support means positioned outwardly and downwardly of the aforesaid side wall adjacent the discharge end of the transverse conveyor for spreading material received from the transverse conveyor transversely outwardly of and longitudinally of the container.

6. The invention defined in claim 5 in which the material throwing device is in the form of a rotor having its axis at an angle to the path of moving material, the rotor further having radial arms with a peripheral speed greater than the movement of material in the path for accelerating movement of the material as it contacts the rotor.

7. The invention defined in claim 6 in which the conveyor is composed of one part within the confines of the upright side walls and a second part projecting outwardly of one of the side walls, and the rotor is supported on the container by said support means mounting it on the terminal end of the conveyor second part.

References Cited in the file of this patent

UNITED STATES PATENTS

| | | |
|---|---|---|
| 2,518,802 | Markel | Aug. 15, 1950 |
| 2,704,670 | Vutz et al. | Mar. 22, 1955 |
| 2,758,841 | Larsson | Aug. 14, 1956 |
| 2,822,946 | Van Drisse | Feb. 11, 1958 |

OTHER REFERENCES

"Machines for Power Farming" (Stone), published by John Wiley and Sons (New York), 1957. Pages 503 and 504 relied on.